March 30, 1926.                                                    1,578,535
C. A. LINCOLN
COMBINATION SPRING COVER
Filed Nov. 27, 1923                       2 Sheets-Sheet 1
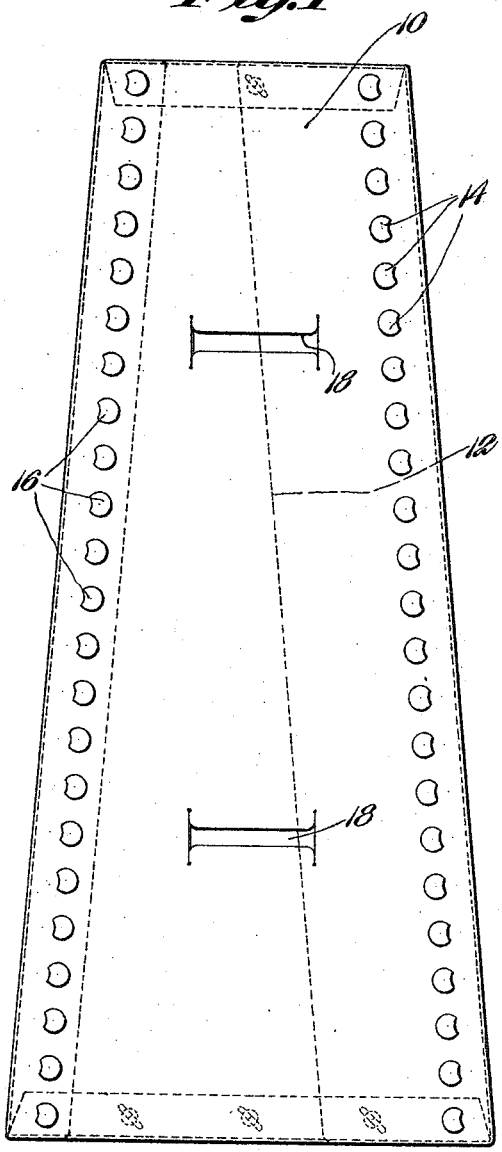
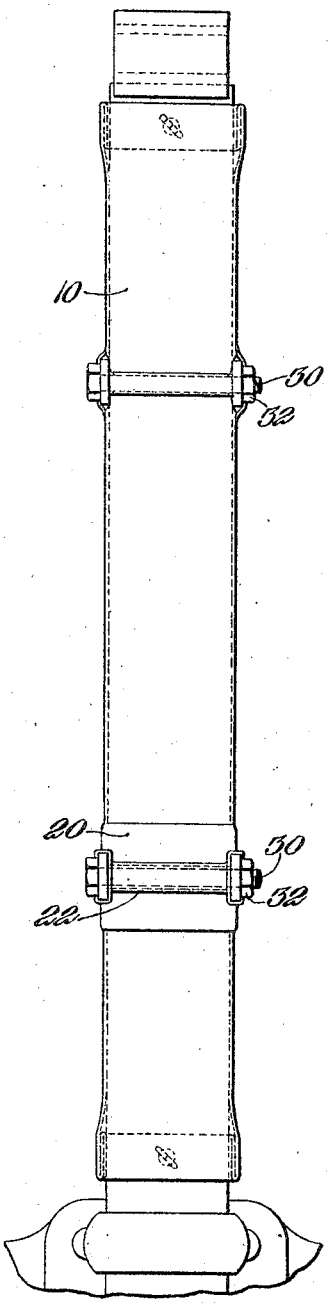

March 30, 1926. 1,578,535
C. A. LINCOLN
COMBINATION SPRING COVER
Filed Nov. 27, 1923   2 Sheets-Sheet 2
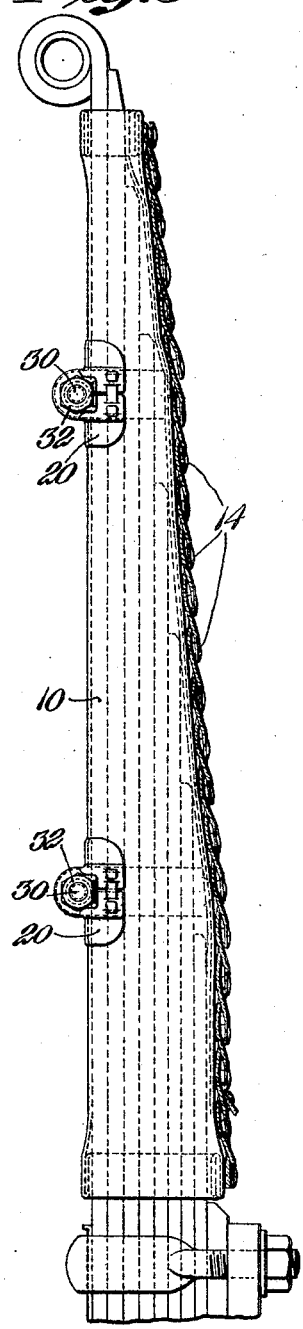
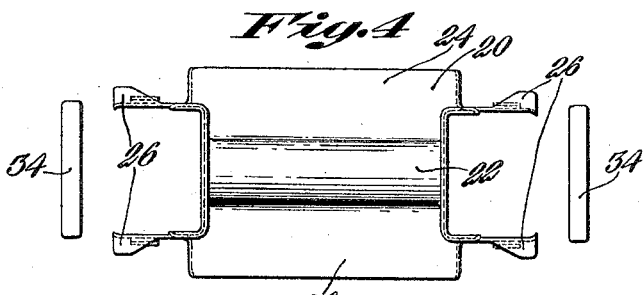
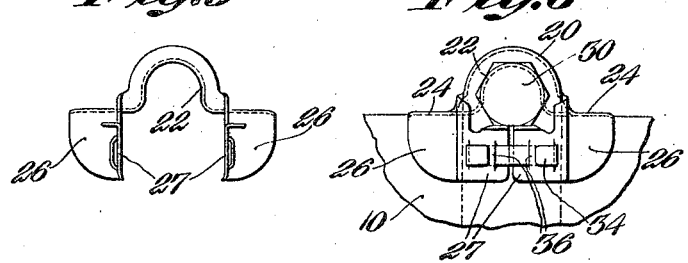
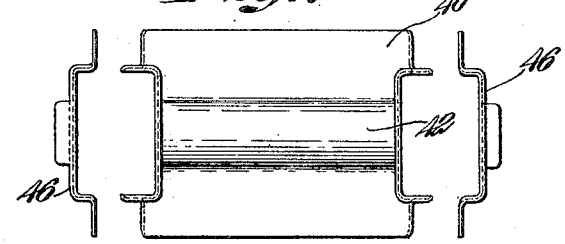
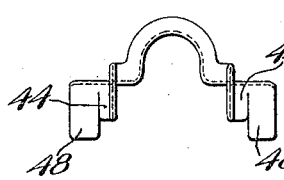
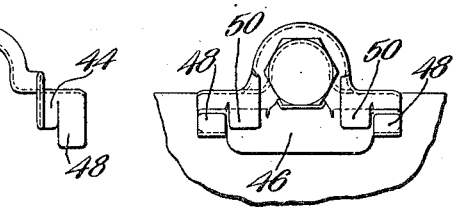

Patented Mar. 30, 1926.

1,578,535

UNITED STATES PATENT OFFICE.

CARLISLE A. LINCOLN, OF BUFFALO, NEW YORK, ASSIGNOR TO THE HOUDAILLE COMPANY, OF BUFFALO, NEW YORK, A CORPORATION OF DELAWARE.

COMBINATION SPRING COVER.

Application filed November 27, 1923. Serial No. 677,214.

*To all whom it may concern:*

Be it known that I, CARLISLE A. LINCOLN, a citizen of the United States, residing at Buffalo, in the county of Erie and State of New York, have invented certain new and useful Improvements in Combination Spring Covers; and I do hereby declare the following to be a full, clear, and exact description of the invention, such as will enable others skilled in the art to which it appertains to make and use the same.

The present invention relates to devices for enclosing and protecting vehicle springs and more particularly to devices of this character commonly known as spring boots or casings.

The object of the present invention is to reorganize and improve devices of this character to improve the appearance and fit of the covers and at the same time enlarge the range of springs to which the covers may be applied.

With this object in view the various features of the invention consist in certain novel features of construction, combinations and arrangements of parts hereinafter described and claimed, the advantages of which will be obvious to those skilled in the art from the following description.

In the accompanying drawings illustrating the preferred form of the invention Fig. 1 represents a plan view of a spring cover adapted to extend from the central portion to the end of a spring and slit to accommodate the spring clips; Fig. 2 is a top plan view of the cover applied to a vehicle spring; Fig. 3 is a side elevation of the cover shown in Fig. 1; Fig. 4 is a detail illustrating a top plan view of the closure member for sealing the cover adjacent the spring clip; Fig. 5 is an end view of the closure member shown in Fig. 4; Fig. 6 is a detail illustrating a side view of the closure member as applied to the cover; Fig. 7 is a top plan view of a modified form of closure member; Fig. 8 is an end view of the member shown in Fig. 7; and Fig. 9 is an end view of the closure member applied to the cover.

The spring cover constituting the illustrated embodiment of the invention comprises essentially a flexible casing extending lengthwise of the spring from the central portion to the end and one or more closure members cooperating with the flexible casing at the spring clips to seal the casing at this point or points and present a finished appearance to the cover as a whole. Upon referring to Fig. 1 of the drawings, it will be observed that a tapered casing 10 of flexible material is provided with a tongue or flap 12 along one edge and with two series of lacing hooks indicated at 14 and 16. This form of casing tapers generally in accordance with the decreasing cross section of the spring as the end is approached but is not enlarged to extend about the spring clips. In order to apply the casing to a given spring, the latter is first laid upon the spring and marked at the points where the spring clips are located. Thereafter the casing is slit or cut, as indicated at 18, so that the clip bolt and the upper ends of the clip may project therethrough when the casing is positioned upon the spring. With this construction the casing may be drawn tightly about the spring, leaving the upper ends of the spring clips projecting therethrough and is free from the baggy or bulging appearance commonly presented when the casing completely envelops the spring clips. Although such a construction permits a well fitting spring boot, nevertheless it is essential that provision be made for sealing the casing adjacent the spring clips, as otherwise the lubricant will very soon leak out, especially if the spring is lubricated, as is customary, through the application of grease under pressure to the interior of the casing. According to the present invention, the region adjacent the upper portion of the spring clips is closed and a neat and finished appearance imparted to the casing as a whole through the employment of a closure member extending over the clip bolt and surrounding the bolt and the upper ends of the spring clip, in addition completely closing the previously formed slit or opening in the casing. Upon referring to Figs. 3 to 6 inclusive of the drawings, it will be seen that the closure member comprises a relatively thin metallic plate 20 having a trough or depression 22 formed therein to receive the usual spring bolt in such a manner that when assembled upon the top of the spring the bolt is received in the depression 22 and the relatively flat portions 24 bear upon the casing at opposite sides of the bolt. The plate 20 is provided at opposite ends with extensions or wings 26 which extend outwardly and downwardly from the plate, as indicated more particularly in Figs. 4 and 5. After the closure member has been placed in position over the spring bolt, fins 27 formed upon the extensions 26 are bent toward one another from the position shown in Fig. 5 into the position shown approximately in Fig. 6, in this position the fins being in substantial alinement with the main body of the extension and projecting beneath the head of the clip bolt 30 at one side and the locking nut 32 at the opposite side of the spring. These locking fins are retained in position by separate tongues 34, which pass through openings 36 formed in the fins and are turned over at their outer ends, as shown clearly in Fig. 6, to lock the closure member assembly firmly in position upon the spring clip. With this construction, the closure member may be applied without removing either the clip bolt or the spring clip itself and when assembled and the locking tongue inserted is firmly locked in position through engagement with the oppositely projecting ends of the bolt to seal the casing in the region of the clip.

A somewhat modified form of closure member adapted to be applied in the same manner as the closure member previously described is illustrated in Figs. 7 to 9 of the drawings. This closure member consists of a relatively thin metallic plate 40 having a trough or depression 42 formed therein for the reception of the clip bolt. The opposite ends of the closure are provided, as shown in Figs. 7 and 8, with outwardly and downwardly projecting wings 44 which extend down the sides of the spring adjacent the clip. This closure is locked in place through the provision of separate locking plates 46 passing beneath the opposite ends of the clip bolt and being held in place through turned up portions 48, as shown clearly in Fig. 9. As indicated in this figure, the locking plates 46 are supported by the portions 48 and are locked against accidental displacement therefrom by downwardly projecting flanges 50 behind which the plate passes.

With this type of construction, a single standard spring cover may accommodate a considerable range of springs, especially in those cases where the length and diameter of the springs do not vary substantially, although the location of the clips and the number of clips may vary. As will be obvious to those skilled in the art, a variation in the location of the spring clips or the number of the clips may be accommodated by varying the location and number of the openings for the reception of the clips when the spring cover is applied.

What is claimed is :—

1. A spring cover comprising a casing of flexible material extending lengthwise of the spring and having an opening therein for the reception of the upper portion of a spring clip, a closure member extending about the upper portion of the spring clip and connected to the latter in a manner to prevent displacement, and flanges upon the closure member adapted to engage with the casing about the opening.

2. A spring cover comprising a casing of flexible material wrapped about the body of a spring and extending lengthwise thereof, the casing having an opening to permit the upper end of a spring clip to project therethrough, and a closure member extending across the top of the spring in a manner to close the opening in the casing, the closure member having a portion adapted for engagement with the spring clip to lock the member thereto.

3. A spring cover comprising a plate having a tubular portion with oppositely extending flanged portions adapted to extend across the top of a spring and partially down the sides, and means cooperating with the depending portions of the flanges to lock the member in place through engagement with a cross bolt of a spring clip.

4. A spring cover comprising a plate having a centrally disposed tubular portion adapted to surround a cross bolt with oppositely extending flanges, wings depending from the ends of the flanges adapted to extend down the sides of the spring and engage beneath the ends of the cross bolt, and a removable tongue cooperating with the wings for locking the plate to a cross bolt.

CARLISLE A. LINCOLN.